United States Patent Office 3,102,903
Patented Sept. 3, 1963

3,102,903
CARBONYLIC COMPOUNDS CONTAINING THE SF₅ FUNCTION
Donald D. Coffman, West Chester, Pa., and Charles W. Tullock, Wilmington, Del., assignors to E. I. du Pont de Nemours and Company, Wilmington, Del., a corporation of Delaware
No Drawing. Filed Oct. 31, 1961, Ser. No. 148,817
8 Claims. (Cl. 260—481)

This invention relates to, and has as its principal objects provision of, novel compositions of matter containing the SF₅— function and the preparation of the same.

Our copending application, Serial No. 92,179, filed February 28, 1961, discloses and claims a one-step synthesis of SF₅Cl which consists in reacting chlorine with sulfur tetrafluoride and a fluoride of a metal of group I of the periodic system having an atomic number of 11 to 55. There are now provided novel derivatives of SF₅Cl which may be generically described by Formula I:

(I)
$$SF_5-\underset{\underset{R'}{|}}{\overset{\overset{R}{|}}{C}}-\overset{\overset{O}{\|}}{C}-X$$

in which R and R' are hydrogen or alkyl groups of up to 19 carbons, preferably of up to 7, and X is hydrogen, hydroxyl, chlorine, aryloxy of up to 14 carbons, preferably of up to 7, alkoxy or alkyl of up to 19 carbons, preferably of up to 7, or —NAB, in which one or both of A and B are hydrogen or hydrocarbon radicals, particularly alkyl of up to 19 carbons, aryl of up to 14 carbons, or cycloalkyl of up to 8 carbons, and N is nitrogen.

The compounds of Formula I in which R and R' are alkyl or hydrogen and X is alkyl are obtained by reacting SF₅Cl with an α-alkyl substituted vinyl organic ester in accordance with the equations:

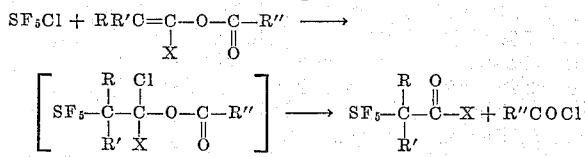

in which one or both of R and R' are hydrogen or alkyl of up to 19 carbon atoms, preferably of up to 7 carbon atoms, and R'' and X are alkyl of up to 19 carbon atoms, preferably of up to 7 carbon atoms. Examples of α-alkyl substituted vinyl organic esters usable in this process are those in which the alkyl substituent is of up to 19 carbon atoms, particularly of up to 7 carbon atoms, such as (α-methyl)vinyl acetate, (α-butyl)vinyl propionate, (α-hexyl)vinyl acetate, (α-decyl)vinyl butyrate, (α-dodecyl)vinyl octanoate, (a-octadecyl)vinyl caproate, methyl-α-propenyl acetate, methyl-a-isobutenyl butyrate, methyl-α-methyl-α-propenyl heptanoate, methyl-α-methyl-isobutenyl stearate, and the like.

In accomplishing the reaction of SF₅Cl with the α-alkyl substituted vinyl organic ester, a pressure reactor is charged with the ester, cooled to between —70° C. and —80° C., evacuated, and then charged with the SF₅Cl. The quantities of reactants employed are usually equimolar although in some instances the ester is used in excess. After being charged, the reactor is closed and the charge is maintained between —19° C. and 175° C. under autogenous pressure with agitation for from ten minutes to six hours. The reaction mixture is removed from the reactor and the desired product isolated by fractional distillation or other method known to those skilled in the art.

As noted, the reaction between SF₅Cl and the ester may be carried out at temperatures of from —19° C. to 175° C. Generally, however, temperatures in the range of 20 to 125° C. are used because within this range the best yields of desired products, with good reaction rates, are realized.

The reaction is usually conducted in a closed reactor constructed of material inert to reactants and reaction products. Reactors made from various nickel-iron-molybdenum alloys are commercially available and are quite suitable. The size of the reactor is not critical, the particular size used being dependent upon the amounts of reactants.

Autogenous pressures are satisfactory. If desired, however, the reaction can be conducted under externally applied pressures. Such pressures generally have no practical advantage but complicate equipment design. In some cases, in fact, reaction occurs at atmospheric pressure and the reflux temperature of SF₅Cl (—19° C.).

The time of reaction is variable and can range from a few minutes to several hours. In some instances after reaction is seemingly complete, it is desirable to permit the reaction mixture to stand at ambient temperatures for periods of time up to 48 hours.

A reaction medium is not essential but is used in some cases because it brings about better contact between the reactants and acts as a moderator for the reaction. Suitable media are those which are normally liquid and inert to the reactants and reaction products. Such media include perhalocarbons, e.g., carbon tetrachloride, trichlorofluoromethane and 1,1,2-trichloro-1,2,2-trifluoroethane, and the like. The amount of any reaction medium used is not critical and can equal or exceed by many fold the combined weight of the reactants.

Formylalkylsulfur pentafluorides, i.e., compounds of Formula I in which X is hydrogen, are obtained by reacting as a precursor a 1:1 molar adduct of SF₅Cl and one of certain vinyl organic esters with an alkali metal hydroxide, preferably sodium or potassium hydroxide, in the presence of a monohydric alcohol or a glycol. Any liquid monohydric alcohol or glycol is suitable in this reaction. The adducts employed as precursors are those of SF₅Cl and vinyl organic esters carrying a hydrogen in the α-position, i.e., vinyl organic esters having the formula

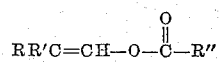

wherein R, R' and R'' have the previously assigned definitions. These precursors are prepared by direct interaction of SF₅Cl and the vinyl organic ester, all as illustrated in Example VI below. Reaction conditions are the same as those for reaction with esters having no hydrogen in the α-position, i.e., the α-alkylsubstituted esters discussed above. Vinyl esters suitable for synthesizing these precursors include vinyl formate, vinyl acetate, vinyl butyrate, vinyl caproate, vinyl dodecanoate, vinyl hexadecanoate, vinyl stearate, and the like.

Compounds of Formula I in which R and R' are hydrogen or alkyl and X is chlorine are obtained by reacting SF₅Cl with a ketene according to the equation:

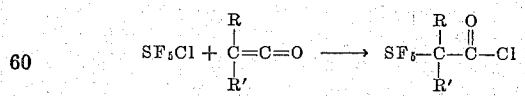

R and R' being as above. In some instances small amounts of the compound

are also produced by this reaction. Examples of ketenes usefully employable in the reaction are ketene, methyl ketene, dimethyl ketene, diethyl ketene, dibutyl ketene, diheptyl ketene, and the like. Conditions for accomplishing the reaction of SF₅Cl with a ketene are essentially those of the reaction with an organic vinyl ester and need not be repeated.

The products from the reaction of SF₅Cl with ketenes are acid chlorides and, as such, serve as precursors of those novel compounds of Formula I in which, respectively, R and R′ are hydrogen or alkyl and X is hydroxyl, alkoxy, aryloxy, or —NAB, where N, A and B have the already indicated meanings. These products are obtained by treating the acid chlorides with water, alcohols, phenols, ammonia or primary or secondary amines.

Acids, i.e., compounds of Formula I where X is hydroxyl, are made by the simple hydrolysis of the acid chloride as illustrated in Example III, below.

Esters, i.e., compounds of Formula I where X is aryloxy or alkoxy, are made by the reaction of the acid chloride with a phenol or an alcohol as illustrated in Example IV. In place of the ethanol of this example, there can be used other alcohols, including propanol, butanol, hexanol, octanol, dodecanol, octadecanol, ethylene glycol, propylene glycol, glycerol, and the like. Suitable phenols which can be used to prepare esters in which X is aryloxy are phenol, 1-hydroxy-2,3-dimethylbenzene, resorcinol, phloroglucinol, 1-naphthol, and the like.

The reaction between the alcohol and acid chloride is carried out under anhydrous conditions at reflux, which for the lower molecular weight alcohols and phenols usually involves a temperature below 150° C. The amount of alcohol or phenol used is theoretically the molar equivalent of the acid chloride. If desired, larger amounts of the alcohol or phenol can be used. Although it is not essential, in some instances an acid acceptor is included with the alcohol or phenol and acid chloride in the reaction system. When an acid acceptor is used, the amount employed is that which is required to react with the hydrogen chloride liberated in the reaction. Suitable acid acceptors are tertiary amines, particularly pyridine, alkali metal hydroxides and the like. Instead of the free alcohol or phenol there can be used an alkali metal alcoholate or phenolate.

The amides are the products obtained by reaction of the acid chloride with ammonia or with a primary or secondary amine. These amines may be aliphatic, aromatic, or cycloaliphatic. Suitable aliphatic amines are the alkylmines containing up to 19 carbons. Examples of such amines are methyl, butyl, decyl, and octadecyl amines, diethylamine, dibutylamine, methyldecylamine, and the like. Suitable aromatic amines are the monocarbocyclic amines of up to 10 carbon atoms, e.g., aniline, ethylaniline, tolylamine, xylylamine, and the like. Suitable cycloaliphatic amines are the monocarbocyclic amines of up to 19 carbons, e.g., cyclohexylamine, methylcyclohexylamine, decylcyclohexylamine, and the like.

The amine (or ammonia) and acid chloride react in equimolar proportions. Usually, however, it is preferred to use an excess of the amine over the theoretical amount so that the excess acts as an acid acceptor. The amidation is carried out at ambient temperature but since the reaction is exothermic it is best to provide cooling means to moderate the heat of reaction. The reaction is conducted in the presence of a reaction medium which is preferably a solvent for the acid chloride and amine. Diethyl ether and dipropyl ether are suitable media.

With amines which are normally liquid or solid, it is only necessary to mix solutions thereof with a solution of the acid chloride, and after completion of the addition to reflux the solution for periods of time ranging from 30 minutes to two hours to complete the reaction. With volatile amines, it may be necessary to effect the reaction in a closed reactor to avoid loss of amine.

The examples which follow illustrate but do not limit this invention.

EXAMPLE I

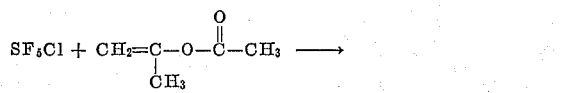

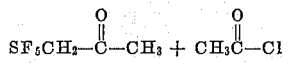

Isopropenyl acetate (155 g., 1.55 moles) and SF₅Cl (112 g., 0.69 mole) were heated with agitation at 100° C. for one hour in a 500 ml. nickel-iron-molybdenum alloy pressure reactor at autogenous pressure. The reactor was thereafter allowed to cool and the contents were discharged. From the reaction mixture there was recovered 243 g. of liquid products. Distillation through a spinning band column yielded 29 g. of acetyl fluoride, B.P. 18 to 30° C., 43 g., B.P. 30° to 80° C., which infrared indicated to be a mixture of acetone and monochloroacetone, and 43 g. of isopropenyl acetate starting material, B.P. 80 to 100° C.

Although acetyl chloride should theoretically have been found among the reaction products, as shown in the equation, actually none was found. It is not known why this should have been so, but it is possible that if any acetyl chloride was formed, it did not survive the reaction conditions used, inasmuch as the only acyl halide isolated was acetyl fluoride.

There remained in the distillation vessel 116 g. of higher boiling product. This product was washed three times, using each time a solution of 135 g. of Na₂S₂O₃.5H₂O in 300 ml. of water to remove chloroacetone. The emulsion which resulted was broken by addition of methylene chloride. After drying over anhydrous magnesium sulfate, the product was distilled through a spinning band column. There was thus obtained 56 g. of product boiling at 53° to 54° C./47 mm. or at 126° C. under atmospheric pressure. Mass spectrometric analyses indicated the product to comprise 96.5 to 98.5 mole percent of SF₅CH₂COCH₃, acetonylsulfur pentafluoride, and 1.5 to 3.5 mole percent of ClCH₂COCH₃. Gas chromatography indicated the product to contain 98% of SF₅CH₂COCH₃ and 2% ClCH₂COCH₃. The formation of the chloroacetone noted above suggests that the addition of SF₅Cl to isopropenyl acetate also may have occurred in the reverse direction to that which led to the formation of acetonylsulfur pentafluoride.

An analytically pure sample of the ketone was obtained by washing crude product repeatedly with water until it was free of chemically bonded chlorine. The sample so purified distilled at 54° C./48 mm. and analyzed as follows:

*Analysis.*—Calcd. for C₃H₅F₅OS: C, 19.57; H, 2.72; F, 51.63. Found: C, 20.29; H, 3.09; F, 50.23.

Additional evidence for this structure resulted from the formation of a 2,4 - dinitrophenylhydrazone, M.P. 143–145° C., from the reaction with 2,4-dinitrophenylhydrazone. The derivative analyzed as follows:

*Analysis.*—Calc. for C₉H₉F₅N₄O₄S: N, 15.38. Found: N, 15.24.

Further evidence for the

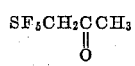

structure was obtained from the fluorine magnetic resonance, which showed the presence of an SF₅ group. The quintuplet splitting for the CH₂ proton magnetic resonance was taken as evidence for the SF₅CH₂ grouping. Infrared analysis showed carbon-hydrogen absorption at 3.3μ, carbonyl absorption at 5.8μ, and SF₅ absorption at 11–12μ. The ketone yielded a positive iodoform test on reaction with iodine:potassium iodide solution in an alkaline medium, which was further proof that the

grouping was present.

EXAMPLE II

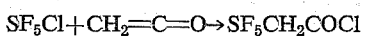

Ketene (32 g., 0.76 mole) and SF$_5$Cl (122 g., 0.75 mole) in 190 ml. of carbon tetrachloride were maintained at 25° C. for 20 hours with agitation in a 500 ml. pressure reactor made of a nickel-iron-molybdenum alloy.

From duplicate runs there was obtained on distillation 181 g. of colorless chloroformylmethylsulfur pentafluoride, B.P. 47° to 48° C./97 mm., 102° C., at atmospheric pressure. Fluorine magnetic resonance showed the presence of an SF$_5$— group; the proton magnetic resonance spectrum indicated one type of hydrogen, which was split into a quintouplet. This is taken as evidence of the presence of the SF$_5$CH$_2$— group. Infrared analysis showed C—H absorption at 3.36$\mu$ and 3.34$\mu$, >C=O at 5.56$\mu$, and strong SF$_5$ absorption at 11 to 12$\mu$. Analysis of the product gave the following results:

*Analysis.*—Calcd. for C$_2$H$_2$ClF$_5$OS: C, 17.36; F, 46.45. Found: C, 17.69; F, 46.05.

The above experiment was repeated, operating at atmospheric pressure under reflux conditions. Under these conditions SF$_5$CH$_2$COCl was obtained in about 10% conversion, based on the SF$_5$Cl charged to the reactor.

EXAMPLE III

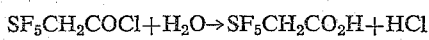

Thirty-five grams of the SF$_5$CH$_2$COCl, prepared as in Example II, was added at 24° C. with stirring to 85 ml. of water over a 33-minute period, during which the temperature of the reaction rose to 47° C. Stirring was continued for an additional 20 minutes to complete the reaction. The product was extracted with methylene chloride and dried over magnesium sulfate. Upon removal of the methylene chloride there remained 27 g. of white crystalline carboxymethylsulfur pentafluoride, SF$_5$CH$_2$COOH, which sublimed at 35° to 46° C./0.3 mm. to give 22 g. (a 69% conversion, based on the SF$_5$CH$_2$COCl) of product melting at 62° to 64° C. The SF$_5$CH$_2$COOH was readily crystallized from carbon tetrachloride solution. Nuclear magnetic resonance (fluorine) showed that an SF$_5$ group was present, and the proton spectrum indicated the presence of an acidic hydrogen atom. There was also another hydrogen atom which was split into a quintuplet, indicating the presence of an SF$_5$CH$_2$— grouping. Infrared analysis showed the presence of carboxyl by absorption in the 3$\mu$ and 5.8$\mu$ region, and of an SF$_5$ group by absorption in the 11 to 12$\mu$ region. The product analyzed as follows:

*Analysis.*—Calcd. for C$_2$H$_3$F$_5$O$_2$S: F, 51.08; N.E., 186. Found: F, 50.54; N.E., 185.4.

EXAMPLE IV

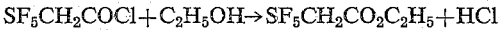

A solution of 14 g. of SF$_5$CH$_2$COCl, prepared as in Example II, in 28 ml. of absolute ethyl alcohol was refluxed for five hours and thereafter distilled. There was obtained 8 g. (which corresponds to a 55% conversion, based on the SF$_5$CH$_2$COCl charged) of colorless ethoxycarbonylmethylsulfur pentafluoride, B.P. 60° C./41 mm., which by nuclear magnetic resonance (fluorine) was shown to have an SF$_5$ group. The proton spectrum indicated two peaks, with some overlapping of the two CH$_2$— groups. Infrared analysis showed saturated —CH at 3.33$\mu$ and 3.42$\mu$, >C=O at 5.70$\mu$, and SF$_5$— by strong absorption in the 11 to 12$\mu$ region. Mass spectographic analysis confirmed the structure as corresponding to the empirical formula SF$_5$C$_4$H$_7$O$_2$.

*Analysis.*—Calcd. for C$_4$H$_7$F$_5$O$_2$S: F, 44.39; S, 14.95. Found: F, 43.51; S, 14.98.

EXAMPLE V

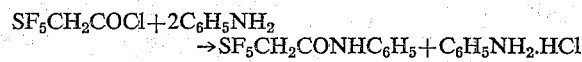

To a solution of 10.2 g. of SF$_5$CH$_2$COCl, prepared as in Example II, in 25 ml. of anhydrous diethyl ether there was added, with stirring, a solution of 9.3 g. of aniline in 25 ml. of anhydrous diethyl ether at 24° C. During the addition the temperature rose to 32° C. After completion of the addition, the mixture was heated to reflux, held at reflux for one hour, and the reaction mixture was then allowed to stand at ambient temperature overnight. The aniline hydrochloride was removed by filtration, and the filtrate was then distilled to remove the diethyl ether. The residue was a light brown solid which weighed 12 g. This corresponds to a conversion of 92%, based on the weight of the SF$_5$CH$_2$COCl charged. An aliquot portion of the solid anilide was purified by crystalizing three times from solution in hot carbon tetrachloride. The purified (phenylcarbamoyl)methylsulfur pentafluoride melted at 114° to 116° C. The infrared spectrum of the solid was very similar to that of acetanilide, except that it showed strong absorption in the 11 to 12$\mu$ region, which is indicative of the SF$_5$— group.

*Analysis.*—Calcd. for C$_9$H$_8$F$_5$NOS: F, 36.40; S, 12.26. Found: F, 35.11; S, 12.62.

EXAMPLE VI

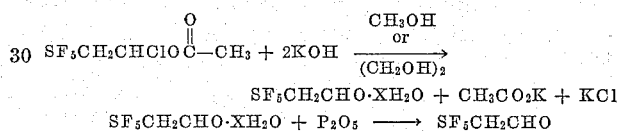

(a) *Methanol Procedure*

To a solution of 50 g. of

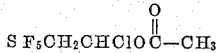

prepared as described subsequently, in 100 ml. of methanol in a 1-liter round bottom flask was added over a period of 38 minutes a solution of 26.5 g. of 85% potassium hydroxide in 250 ml. of methanol, during which time the temperature of the reaction mixture was maintained at 15° to 28° C. by cooling in an ice bath. After completion of the addition of the potassium hydroxide solution, the ice bath was removed, and the reaction mixture was stirred for five hours at 25° C. Thereafter the reaction mixture was filtered to remove the solid product which had separated. On standing overnight, a small amount (1.26 g.) of solid material had formed. It was removed by filtration. The filtrate was then subjected to distillation through a spinning band column. The product which distilled at 35° to 41° C./100 mm. separated into an upper layer (6 g.), which was chiefly water, and a lower layer (16 g.), which was identified as SF$_5$CH$_2$CHO·XH$_2$O. Infrared analysis of the aldehyde hydrate showed strong absorption at 2.9$\mu$ for —OH and no absorption in the carbonyl region. The contents of the cold trap (6 g.) and the 16 g. of SF$_5$CH$_2$CHO·XH$_2$O were added with cooling to 16 g. of phosphorus pentoxide. The product was removed by gentle warming under 1 mm. pressure to obtain 11 g. of formylmethylsulfur pentafluoride, SF$_5$CH$_2$CHO. Infrared analysis of this product showed strong absorption at 5.75$\mu$ for carbonyl and only very weak absorption in the 2.9$\mu$ region for hydroxyl which resulted from the inadvertent addition of traces of water. The infrared absorption pattern for this product was identical with that of an analytically pure sample of SF$_5$CH$_2$CHO.

(b) *Ethylene Glycol Route*

To a solution of 75 g. of

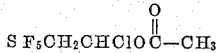

in 75 ml. of ethylene glycol there was added at 25° C., with stirring, a solution of 36 g. of 85% potassium hydroxide in 300 ml. of ethylene glycol over a period of 99 minutes, during which time the temperature rose to 45° C. Stirring was continued without external heating for an additional six hours. After standing for about 48 hours (week end), the contents were filtered, and the filtrate was distilled under reduced pressure. When 3 g. of ethylene glycol had distilled over at 50° C./2 mm., the contents of the trap cooled with liquid nitrogen were examined. The upper layer was found to weigh 13.4 g. and appeared to be primarily water, while the 6.5 g. in the lower layer appeared to be $SF_5CH_2CHO \cdot XH_2O$. Distillation was accordingly continued at 65° to 70° C./2 mm., and an additional 22 g. of crude $SF_5CH_2CHO \cdot XH_2O$ was collected in the trap cooled with liquid nitrogen. Although the aldehyde hydrate distills at a much lower temperature than ethylene glycol, separation of the two was effected only by distillation of the ethylene glycol, during which the more volatile aldehyde was concentrated in the liquid nitrogen-cooled trap. To an aliquot of the crude $SF_5CH_2CHO \cdot XH_2O$ there was added phosphorus pentoxide with cooling, and the volatile product was removed by gentle warming under 1 mm. pressure. The residue was found to have a B.P. of 38° C./98 mm.

*Analysis.*—Calcd. for $C_2H_3F_5OS$: C, 14.12; H, 1.77; F, 55.90; S, 18.83. Found: C, 14.71; H, 2.17; F, 55.74; S, 19.20.

Infrared analyses showed strong absorption at $3.6\mu$ for —CH, $5.75\mu$ for >CO, and no absorption corresponding to

Fluorine magnetic resonance showed the presence of an $SF_5$— group and the proton resonance spectrum indicated at least two different hydrogens with the $CH_2$— present as a quintuplet, which is indicative of the

group.

Gas chromatography, using a 1 meter column packed with finely divided diatomaceous earth treated with 20% by weight of a silicone oil at 72° C. and a flow rate of 90 cc./minute showed that only one product was present.

The above data, taken with the fact that the product formed a semicarbazone, M.P. 122–124° C., whose infrared spectrum is consistent for

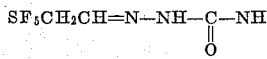

are corroborative of the structure as being $SF_5CH_2CHO$. The

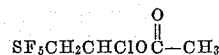

used in the above experiments was prepared as follows:

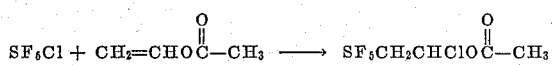

Fifty-two grams of redistilled monomeric vinyl acetate, B.P. 72° C., and 58 g. of $SF_5Cl$ were heated with stirring at 50° C. for one hour in a nickel-iron-molybdenum pressure reactor. The reactor was thereafter allowed to cool and was opened. There was recovered 7 g. of gaseous product, shown by infrared to be a mixture of $SOF_2$, $SF_5Cl$, and $CH_3COF$, and 103 g. of liquid product. Distillation of the liquid yielded 71 g. of material boiling at 36° C./2.7 mm. This corresponds to an 83.5% conversion, based on the $SF_5Cl$ charged. Gas chromotographic analysis showed that the product contained only one material. Elemental analysis (chlorine, fluorine, and sulfur) indicated that a 1:1 molar adduct of $SF_5Cl$ and vinyl acetate had been obtained. This, together with the chemical evidence resulting from the synthesis of formylmethylsulfur pentafluoride from it (Example VI), indicated that the product was $$SF_5CH_2CHClOCCH_3$$
$$\parallel$$
$$O$$

EXAMPLE VII

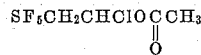

Anhydrous gaseous ammonia (7 g.) was added over a period of 23 minutes to a stirred solution of 21 g. of

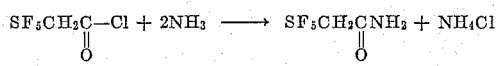

prepared as in Example II, in 175 ml. of anhydrous diethyl ether, cooled in an ice bath, during which the temperature rose from +1° C. to 22° C. and then dropped to 15° C. The solid (16 g.), a mixture of

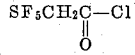

was suspended in 65 ml. of dioxane; 4.4 g. of $NH_4Cl$ remained insoluble. Concentration of the dioxane solution yielded 11 g. of amide; recrystallization of this from hot benzene yielded 7 g. of

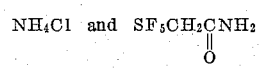

M.P. 143–144° C. The compound, carboxamidomethylsulfur pentafluoride, was shown by nuclear magnetic resonance (fluorine) analysis to contain an $SF_5$ group. Infrared analysis showed $NH_2$ absorption at $2.9\mu$, >C=O at $5.9\mu$, and $SF_5$— by strong absorption in the 11 to $12\mu$ region.

Concentration of the ether solution in which the reaction was carried out yielded an additional 4 g. of crude carboxamidomethylsulfur pentafluoride,

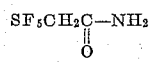

*Analysis.*—Calcd. for $C_2H_4F_5NOS$: C, 12.97; H, 2.16; F, 51.35; S, 17.30. Found: C, 13.54; H, 2.41; F, 50.43; S, 17.10.

The products of this invention are useful intermediates in chemical syntheses and as solvents for polymeric material. Thus, the aldehyde hydrate, prepared as in Example VI, swells the polyamide from hexamethyleneadipamide in the cold and is an active solvent for this polyamide and for "Delrin" acetal resin in the hot, and the acid, obtained as in Example III, is stronger than acetic acid. At temperatures above its melting point, the acid is an active solvent for the polyamide from hexamethyleneadipamide, forming solutions which do not crystallize on cooling. These solutions are eminently useful for forming films, fibers, and the like of polyamides.

Since obvious modifications and equivalents in the invention will be evident to those skilled in the chemical arts, we propose to be bound solely by the appended claims.

The embodiments of the invention in which an exclusive property or privilege is claimed are defined as follows:

1. A compound of the formula

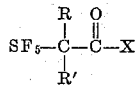

wherein: R and R' are selected from the group consisting of hydrogen and alkyl of up to 19 carbons; and X is selected from the group consisting of hydrogen, hydroxyl, chlorine, aryloxy of up to 14 carbon atoms and alkyl and alkoxy of up to 19 carbon atoms and —NAB, A and B being members of the group consisting of hydrogen and alkyl of up to 19 carbons, aryl of up to 14 carbons and cycloalkyl of up to 8 carbons.

2. The compound of the formula $SF_5CH_2COCH_3$.
3. The compound of the formula $SF_5CH_2COCl$.
4. The compound of the formula $SF_5CH_2COOH$.
5. The compound of the formula $SF_5CH_2COOC_2H_5$.
6. The compound of the formula $SF_5CH_2CONHC_2H_5$.
7. The compound of the formula $SF_5CH_2CHO$.
8. The compound of the formula $SF_5CH_2CONH_2$.

References Cited in the file of this patent

UNITED STATES PATENTS 2,859,245    Smith _____ Nov. 4, 1958

OTHER REFERENCES

Roberts et al.: J. Chem. Soc. (London), 1960, pp. 665–667.

Case et al.: J. Chem. Soc. (London), 1961, pp. 2066–2075.

Pattison et al.: Journal of Organic Chemistry, vol. 21, No. 8, pp. 887–889 (August 1956).

Wagner and Zook: Synthetic Organic Chemistry, John Wiley & Sons, Inc., New York, pp. 418, 481–482 and 566.